Aug. 29, 1944.    G. J. CRONINGER    2,356,829
METHOD AND APPARATUS FOR FEEDING PLASTIC CLAY TO MOLDS
IN THE MANUFACTURE OF POTTERYWARE
Filed March 10, 1944    3 Sheets-Sheet 1
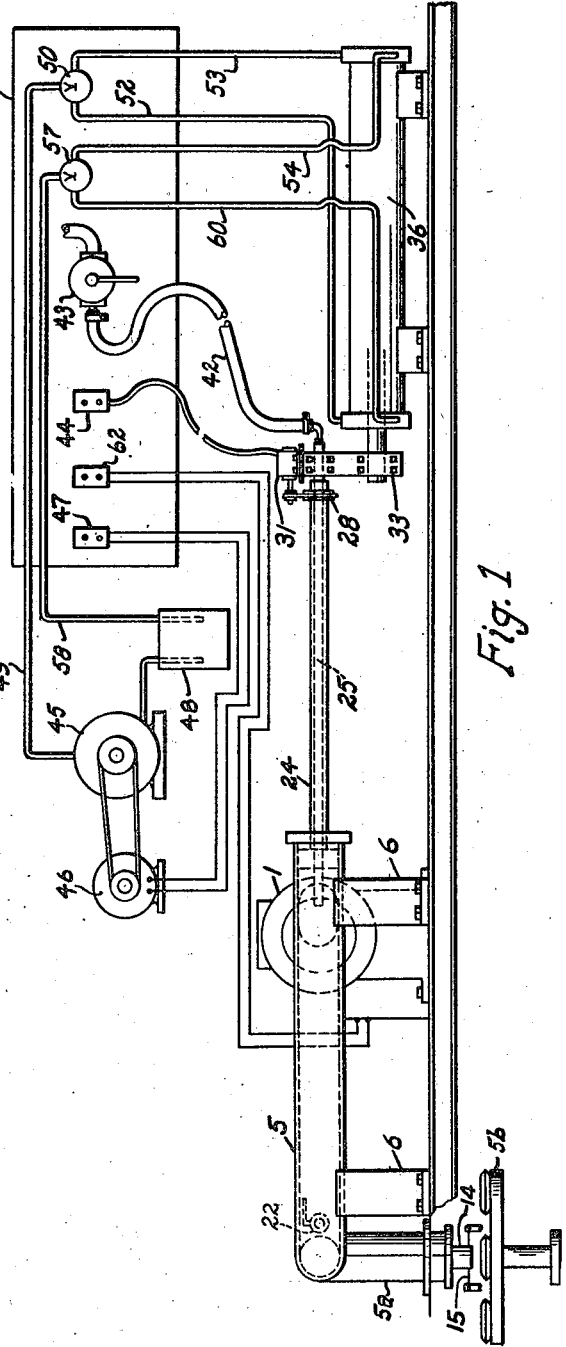
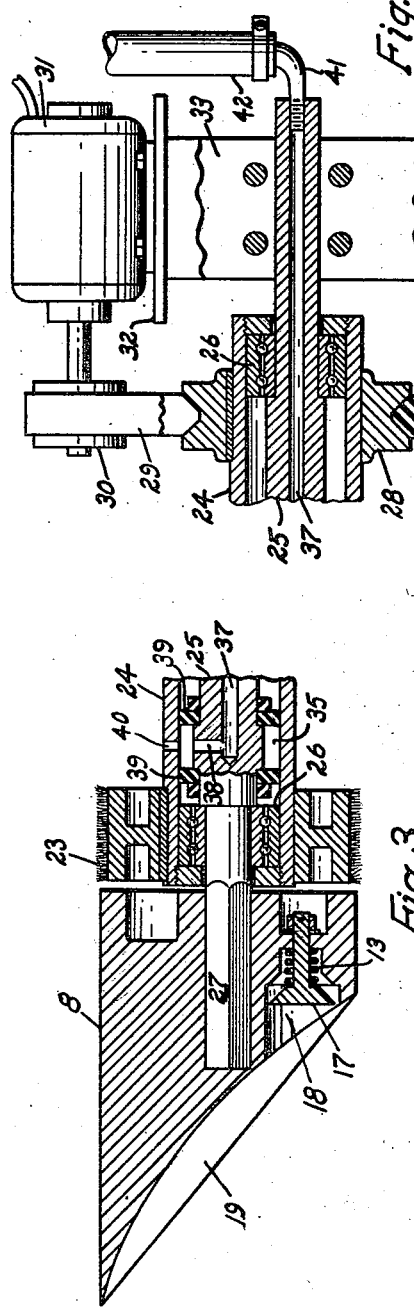
INVENTOR.
George J. Croninger.

Aug. 29, 1944.  G. J. CRONINGER  2,356,829
METHOD AND APPARATUS FOR FEEDING PLASTIC CLAY TO MOLDS
IN THE MANUFACTURE OF POTTERYWARE
Filed March 10, 1944  3 Sheets-Sheet 2

INVENTOR
George J. Croninger

Aug. 29, 1944.   G. J. CRONINGER   2,356,829
METHOD AND APPARATUS FOR FEEDING PLASTIC CLAY TO MOLDS
IN THE MANUFACTURE OF POTTERYWARE
Filed March 10, 1944   3 Sheets-Sheet 3
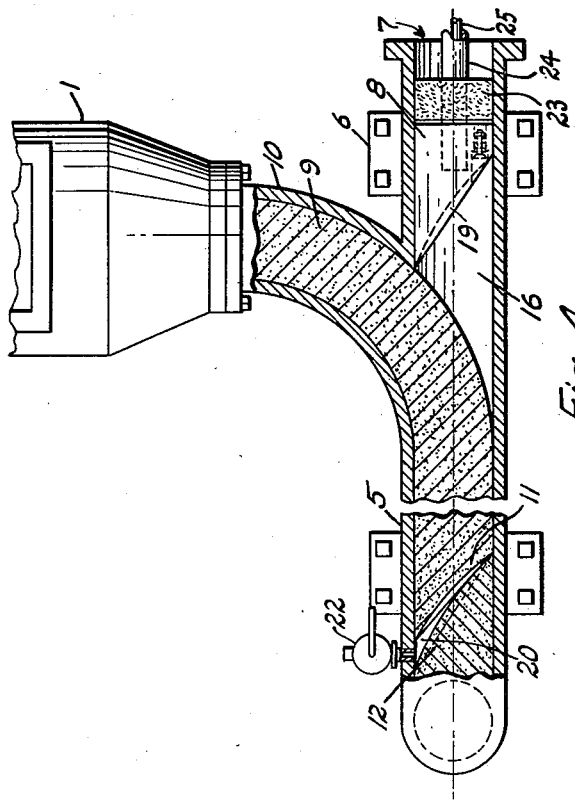
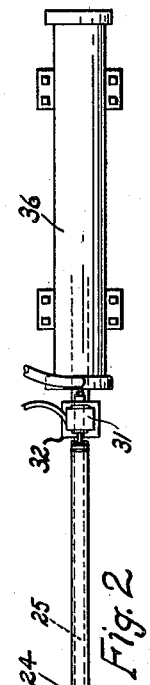
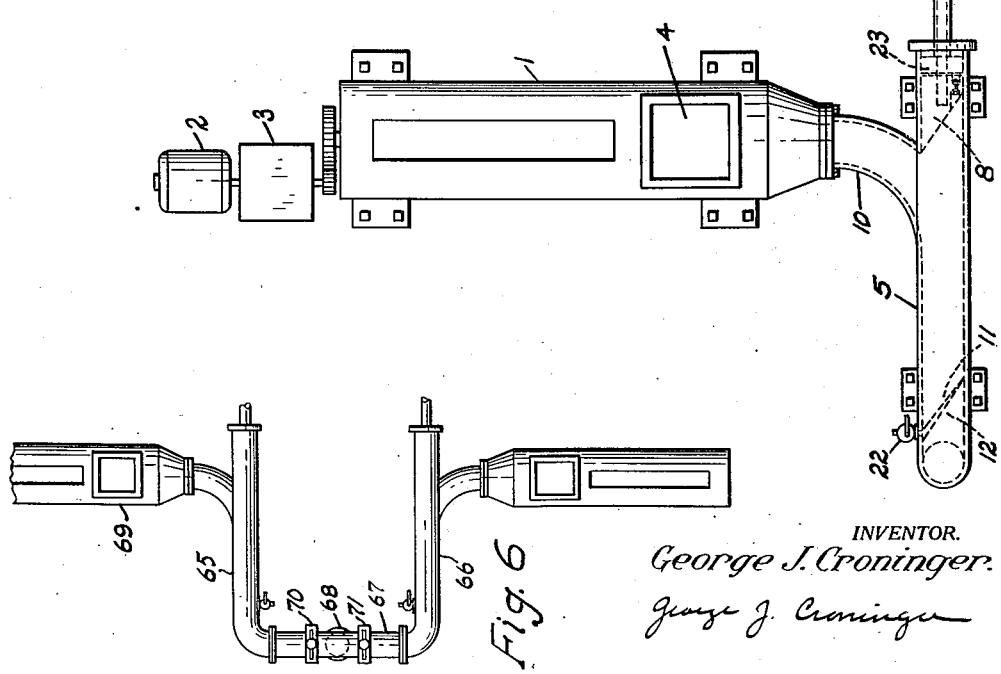
INVENTOR.
George J. Croninger.

Patented Aug. 29, 1944

2,356,829

UNITED STATES PATENT OFFICE 2,356,829

METHOD AND APPARATUS FOR FEEDING PLASTIC CLAY TO MOLDS IN THE MANUFACTURE OF POTTERY WARE

George J. Croninger, Swissvale, Pa., assignor to Miller Pottery Engineering Company, Swissvale, Pa., a corporation of Pennsylvania Application March 10, 1944, Serial No. 525,812

18 Claims. (Cl. 25—16)

This invention relates to apparatus for feeding plastic clay to molds in the manufacture of potteryware such as jiggered dinnerware and is particularly adapted for use with automatic jiggering machinery.

The present invention has to do with improvements in that type of apparatus for feeding plastic clay wherein a pug mill and hydraulic feeder are arranged in such fashion that the pug mill extrudes directly into the magazine of the feeder thus eliminating the need for transportable containers, trucks, hoists and a considerable amount of labor to service the feeder.

The object of the present invention is to provide for extruding clay from the pug mill into the magazine of the feeder with a minimum of harmful distortion or change over the original shape and internal structure of the extrusion thereby to avoid internal separations, folds, overlaps and other defects which deleteriously affect the fabricating, drying and firing behavior of the clay.

In the drawings:

Figure 1 is a side elevation of the preferred form of clay feeding apparatus including a pug mill and an hydraulic feeder.

Figure 2 is a plan view of the apparatus of Figure 1 with certain of the controls omitted.

Figure 3 is a detail in horizontal section through the center of the clay plunger.

Figure 4 is a horizontal section through the clay magazine of the hydraulic feeder illustrating how the clay is fed thereinto from the pug mill.

Figure 5 is a detail, partly in section, showing the drive for rotating a cleaning brush associated with the clay plunger and fluid connections for supplying water thereto.

Figure 6 is a plan view illustrating how two of the feeders may be arranged for alternate operation in order to supply clay through a single outlet leading to a charge cutting off position.

Figure 7:
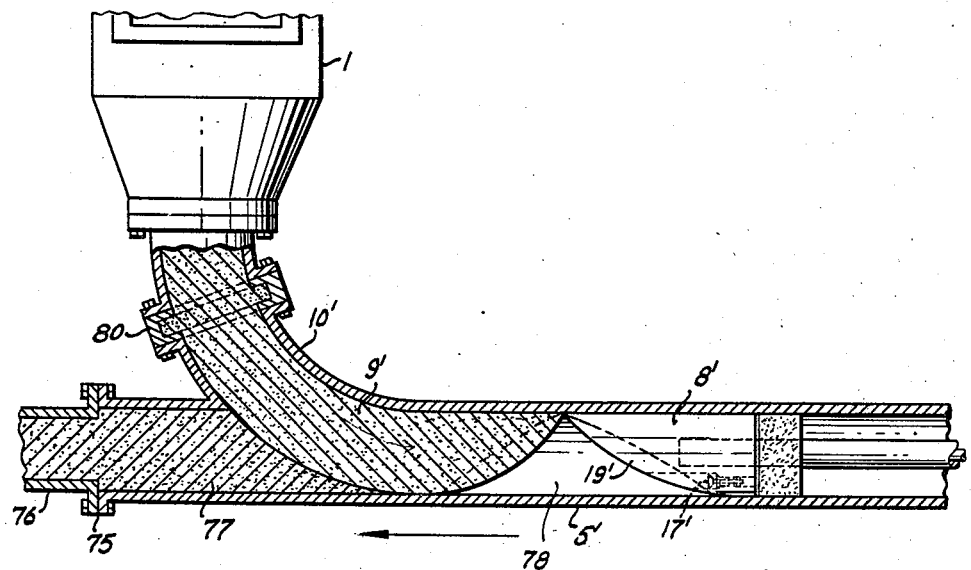
Figure 7 is a horizontal section through the clay magazine of the hydraulic feeder illustrating how the clay may be fed into the magazine from the front rather than the rear end thereof.

With reference to Figures 1 and 2, I is a clay pugging and extrusion machine of conventional design having a motor 2 and power transmission gearing inside housing 3 for rotating the macerating knives and auger inside the pug barrel which cut up the filter cakes and force the same into a degasifying chamber 4 from which the material is extruded into the tubular magazine 5 of the hydraulic feeder which is connected to a downwardly extending pipe 5a leading to the charge segregating position above a potteryware fabricating machine 5b.

The tubular magazine 5 is supported on uprights 6 at the level of the pug mill orifice and has an inlet or opening 7 at the rear end thereof to permit a plunger 8 to be inserted therein. It is preferred that the inside diameter of the tubular magazine be approximately the same diameter as the nozzle orifice of the pug mill or the outside diameter of the column of clay 9, Figure 4, issuing therefrom. Magazine 5 has a side inlet therein connected to the outlet of the pug mill by a curved section of conduit 10 having approximately the same inside diameter as the magazine and the nozzle orifice of the pug mill. This conduit is arranged so as to feed the solid column of clay issuing from the pug mill into the magazine in a forwardly direction from a point near the rear opening 7, preferably just in front of the plunger 8 when in retracted position. The longitudinal centerline or long axis of the magazine 5 and the curved centerline of conduit 10 bear a tangential relationship to one another. The radius of curvature of the conduit section 10 may be any desired and practical amount providing a tangential or near tangential relationship with the longitudinal centerline of the magazine is observed. It will be understood however that there may be some small variation in this relationship without departing from the spirit and scope of this invention.

In traveling through the conduit 10, the column of clay will be bent to the same curvature and upon issuing from the conduit will continue along a path having the same radius of curvature until it is acted upon by the tubular wall of the magazine and straightened out. Thus, due to the tangential relationship mentioned, the column of clay 9 will telescope into the magazine without danger of the leading face 11 being projected against the wall of the magazine opposite the inlet and "mushroomed" which would cause the clay to spread in all directions to fill up the magazine thereby pocketing air and forming folds and overlaps and generally distorting the column. This is considered to have a detrimental effect on the drying and firing behavior of the clay which would not otherwise occur if the column was preserved in substantially the same shape as originally extruded.

In rounding the bend, there is a certain amount of compression along the inside radius of the column of clay and a certain amount of stretching along the outer radius, however this is not considered detrimental and can be minimized by increasing the radius of curvature of the conduit section 10.

The inside wall of the magazine is preferably polished and lubricated thereby insuring that the column of clay will slide easily therein with a minimum of frictional resistance and be reliably guided forward to the trailing end 12 of the preceding column.

The pressure required to force the clay column through the reduced diameter outlet nozzle 14, in the lower end of pipe 5a, Figure 1, at the cut-off position defined by the cut-off wire 15, may exceed 100 pounds per square inch. Under this high pressure clay becomes more plastic thus making it possible to reduce the water content of the clay to be pugged to as low as 16 to 18% without actually lowering the degree of plasticity required for jiggering. The amount of sidewall friction between the column of clay and the polished and lubricated interior of the magazine will not create sufficient resistance to cause this stiffer mix to bend into and fill the space 16 ahead of the plunger face, under the pug mill pressure until the resistance to forward movement of the column in the magazine is increased by engagement with the trailing end of the preceding column. As the space 16 becomes filled with clay the air is forced therefrom through a normally open valve 17 located in a bore 18 in the plunger, on the side opposite the outlet of conduit 10 Figure 3. Said valve is normally held open by a coil spring 13 until it is closed by the pressure of the clay thereagainst which enters the bore ahead of the valve closure. In order to protect the valve seat from the clay, the diameter of the bore 18 and the valve 17 are such as to provide a minimum amount of clearance. This valve is also operative to break the vacuum when the plunger is withdrawn from the trailing end of a column of clay preparatory to refilling the magazine with clay.

Plunger 8 is formed with a concaved, rearwardly slanting working face 19, the leading edge of the surface being on the conduit 10 side of the magazine. When the plunger shears through the material issuing from the conduit 10, the leading end of the column remaining in the conduit 10 is concaved and, although it is sheared off parallel to the axis of the magazine, this end of the aforesaid column assumes an angular position relative thereto when the column straightens out in the magazine.

The working face 19 of plunger 8 will impart to the trailing end 12 of a column of clay, Figure 4, a convexed, sloping surface having approximately the same degree of angularity as the face of the concaved leading end 12 of the next succeeding column. It is preferred to have a small variation in angularity so that the two surfaces will form a V-shaped gap 20 as they commence to nest together thereby providing a clearance space which will close toward one side of the magazine 5 where air release valve 22 is located. Thus the ends of the two columns are fitted together and the air exhausted from between the two surfaces.

Air ahead of the column entering the magazine is forced out through this vent and should the vent become plugged with clay from the previous filling, the air pressure inside the magazine will rise until the plug is blown out. When the air is entirely exhausted from the magazine, clay will be forced through the vent to thereby provide a visible indication that the magazine is filled. The location of the release valve is determined by the forward limit of the stroke of plunger 8 which is always the same for successive strokes.

In order to clean the interior of the magazine of the film of residual clay which may adhere to the wall and to lubricate this surface with a film of water, a revolving brush 23, Figure 3, is mounted just behind the plunger on a hollow shaft 24 in which the plunger shaft 25 is received. Shaft 24 is sealed at both ends and is mounted on antifriction bearings 26, shaft 25 being nonrotatable and having a squared end 27 on which the plunger 8 is fixed. Shaft 24 has a pulley 28 fixed thereon near the rear end, Figure 5, to be driven by belt 29, and pulley 30 on the shaft of motor 31 which is mounted on a platform 32 on top of a coupling device 33 clamped to plunger shaft 25 and the piston rod 34 of an hydraulic cylinder 36, Figure 1.

Water is conducted to the brush through a central longitudinal passage 37 in shaft 25 there being a radial bore 38, Figure 3, in said shaft through which the water is discharged into the space 35 between circular shaft seals 39 and then through one or more holes 40 in shaft 24 to the interior of the magazine. A pipe connection 41, Figure 5 screwed into the rear end of passage 37 connects flexible water hose 42 thereto.

Assuming that the plunger 8 has reached the forward limit of its stroke and is ready to be retracted, the operator first opens water control valve 43 and starts brush motor 31 by means of manual switch 44. To start the plunger 8 back, oil is delivered to the cylinder 36 by a pump 45 driven by motor 46 controlled by push button switch 47. Fluid is pumped from tank 48 into line 49 leading to the inlet port of manually controlled two-way valve 50. One outlet of the valve 50 is connected by line 52 to the forward end of the cylinder 36 and the other outlet of the valve is connected by line 53 to the rear end of cylinder 36. When the valve is in one position of adjustment line 53 is opened and line 52 closed. To reverse the direction of travel of the plunger 8, the operator turns valve 50 to the proper position to close line 53 and open line 52. Pressure fluid in cylinder 36 behind the piston is returned to tank 48 by pipe 54 leading from the rear end of cylinder 36 to two-way manually controlled valve 57 and line 58. The other return line 60, leading from the front end of cylinder 36 to valve 57 is closed during the time line 56 is open. Thus, the operator merely adjusts valves 50 and 57 to obtain the desired movement of the plunger. The rate of travel of the plunger may be varied by changing the setting of the pump. Thus the plunger may be rapidly retracted in order to shorten the period of time needed to refill the magazine.

After the plunger 8 has been fully retracted, the operator shuts off the pump and brush motors, closes the water valve, opens air release valve 22 and starts the pug mill motor controlled by push button switch 62 to thereby feed a column of clay into the magazine. The slurry produced during cleaning is discharged through the open end of the magazine as the brush works rearwardly therein. After the magazine is filled, as indicated by extrusion of clay through valve 22, the pug mill motor is shut-off and the pump motor started. Air release valve 22 is closed and valves 51 and 50 operated to reverse the travel of plunger 8 to thereby commence the clay feeding operation.

It is preferred to group all the controls on a panel 63 for convenience and accessibility.

Figures 8, 9:
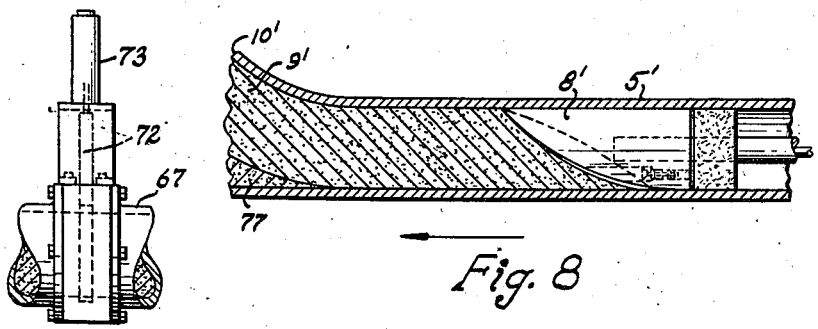
Figure 8 is a horizontal section illustrating how the lead end of the clay column of Figure 7 approaches the plunger face as the magazine is being filled.
Figure 9 is a detail in side elevation of a gate for closing off the tube leading from the pug mill to the clay magazine.

Figure 6 illustrates how the present apparatus may be arranged to provide for continuously feeding clay through a single outlet. Thus two magazines 65 and 66 may be located in spaced parallel relation with their forward ends connected to a common pipe 67 having a vertical branch 68 leading downwardly to the charge segregating position. While pug mill 69 is filling magazine 65, the other magazine 66 may be discharging clay through outlet pipe 68. When magazine 65 is feeding, shut-off valve 70, Figures 6 and 9, is opened and shut-off valve 71 is closed. Said valves comprise a vertically movable closure 72 raised and lowered by an air cylinder 73, the operation being manually or automatically controlled. These valves block the back flow of clay from a working magazine into one that is being filled with clay.

Figure 7 illustrates how a column of clay may be inserted in the magazine 5' by the pug mill 1 from the front end of the magazine rather than the rear end. In this arrangement, conduit 10' leading from the pug mill is connected into the magazine in rear of a pipe connection 75 where a smaller diameter feed pipe 76 is connected to the magazine to provide a certain amount of resistance to forward flow of the stub of clay 77 remaining in this section of the conduit. The plunger face 19' is concaved and shaped to produce a trough or groove in the trailing end of the stub 77 having the same radius of curvature as the column 9' to thereby provide a guide surface over which the column 9' slides in entering the magazine. When withdrawing the plunger 8', it is preferably stopped at a point just in rear of the outlet of pipe 10' and held in this position until the space 78 is filled with clay, the air being vented through valve 17'. After the space is filled, the plunger is moved rearwardly at the same rate of travel or at a slightly slower rate of travel that the column 9' would normally flow into the magazine in order to exert back pressure thereon to cause the column to completely fill the magazine. This is advantageous where there is a slight difference in the outside diameter of the clay column and the inside diameter of the magazine. After the magazine is filled with clay, the pug mill is stopped and a gate 80, similar to that shown in Figure 9 is closed and the plunger started forward in the magazine to force the clay through the outlet at the segregating position.

I claim:

1. Apparatus for feeding plastic ceramic material to potteryware fabricating machinery comprising, in combination, a machine for pugging and extruding plastic ceramic material, said machine having an extrusion orifice, a conduit leading to said fabricating machinery mounted in fixed position having a tubular magazine section provided with a side inlet for receiving extrusion from said machine, a plunger co-axial with the magazine section for movement therethrough to force material from said conduit, a conduit connecting said orifice and inlet positioned and formed to telescope the extrusion into said tubular magazine, and means for actuating said plunger and pugging and extruding machine.

2. Apparatus for feeding plastic ceramic material to potteryware fabricating machinery comprising, in combination, a machine for pugging and extruding plastic ceramic material, said machine having an extrusion orifice, a conduit leading to said fabricating machinery mounted in fixed position having a tubular magazine section provided with a side inlet at the rear for receiving extrusion from said machine, a plunger co-axial with the magazine section for movement therethrough to force material from said conduit, a conduit connecting said orifice and inlet positioned and formed to telescope the extrusion into said tubular magazine from the rear and means for actuating said plunger and pugging and extruding machine.

3. Apparatus for feeding plastic ceramic material to potteryware fabricating machinery comprising, in combination, a machine for pugging and extruding plastic ceramic material, said machine having an extrusion orifice, a conduit leading to said fabricating machinery mounted in fixed position having a tubular magazine section provided with a side inlet at the front end for receiving extrusion from said machine, a plunger co-axial with the magazine section for movement forwardly therethrough to force material from said conduit, a conduit connecting said orifice and inlet positioned and formed to telescope the extrusion into said tubular magazine from the front and means for actuating said plunger and said pugging and extruding machine.

4. Apparatus for feeding plastic ceramic material to potteryware fabricating machinery comprising, in combination, a machine for pugging and extruding plastic ceramic material said machine being adapted to extrude said material through a plurality of outlets, a pair of conduits mounted in fixed position leading to said fabricating machinery, said conduits each having a magazine section provided with a side inlet for receiving extrusion from said machine, a plunger in each magazine movable forwardly therethrough to force material through said conduits, a conduit between the side inlet of each magazine and the pug mill outlets, said last named conduits being positioned and formed so as to telescope the extrusion into the magazine sections and means for actuating said plungers and said pugging machinery.

5. Apparatus for feeding plastic ceramic material to potteryware fabricating machinery comprising, in combination, a machine for pugging and extruding plastic ceramic material, said machine having an extrusion outlet, a conduit leading to said fabricating machine provided with a tubular magazine section having a side inlet through which material is discharged into said magazine, a plunger co-axial with said magazine section for movement therethrough to force material from said conduit, a conduit connecting said orifice and said inlet positioned and curved to direct the extrusion as it enters the magazine into telescoping relation with said magazine, and means for actuating said pug mill and plunger.

6. Apparatus for feeding plastic ceramic material to potteryware fabricating machinery comprising, in combination, a machine for pugging and extruding plastic material, said machine having an extrusion outlet, a conduit mounted in fixed position leading to said fabricating machine provided with a tubular magazine section to be filled with said material, said magazine having a side inlet, a conduit connecting said orifice and inlet of curved formation so positioned that the arc of curvature is tangent to the longitudinal centerline of the magazine, a plunger co-axial with the conduit and means for moving said plunger forwardly in said magazine to force the material from the first named conduit and shear off the leading end of the material in the second named conduit.

7. Apparatus for feeding plastic ceramic material to potteryware fabricating machinery comprising, a machine for pugging and extruding plastic ceramic material, said machine having a delivery orifice, a conduit mounted in fixed position leading to said fabricating machinery said conduct having a tubular magazine section provided with an inlet, a curved conduit connecting said orifice and inlet arranged to telescope the extrusion into said magazine, a plunger co-axial with said magazine for movement therethrough to force material from said conduit, said plunger being formed to reversely contour the trailing end of the extrusion forced through the magazine and the leading end of the material in the curved conduit to cause the same to nest together when they meet in the conduit.

8. Apparatus for feeding plastic ceramic material to potteryware fabricating machinery comprising, a machine for pugging and extruding plastic ceramic material, said machine having a delivery orifice, a conduit mounted in fixed position leading to said fabricating machinery said conduit having a tubular magazine section provided with an inlet, a curved conduit connecting said orifice and inlet arranged to telescope the extrusion into said magazine, a plunger co-axial with said magazine for movement therethrough to force material from said conduit, said plunger being formed to reversely contour the trailing end of the extrusion forced through the magazine and the leading end of the material in the curved conduit to cause the same to nest together when they meet in the conduit and an air vent in said magazine at or about the point in the magazine where the two ends meet through which air is exhausted from the interior of the magazine.

9. Apparatus for feeding plastic ceramic material to potteryware fabricating machinery comprising, a machine for pugging and extruding plastic ceramic material, said machine having a delivery orifice, a conduit mounted in fixed position leading to said fabricating machinery said conduit having a tubular magazine section provided with an inlet, a curved conduit connecting said orifice and inlet arranged to telescope the extrusion into said magazine, a plunger co-axial with said magazine for movement therethrough to force material from said conduit, said plunger being formed to reversely contour the trailing end of the extrusion forced through the magazine and the leading end of the material in the curved conduit so as to cause the same to progressively nest together when they meet in the conduit and an air vent in said magazine at or about the point in the magazine where the two ends meet and on the closing side of the gap between the ends.

10. Apparatus for feeding plastic ceramic material to potteryware forming machinery comprising, in combination, a machine for pugging and extruding plastic ceramic material, said machine having an extrusion orifice, a conduit mounted in fixed position leading to said machinery, said conduit having a tubular magazine section open at the rear end and provided with a side inlet, a curved conduit connecting the orifice and inlet arranged to insert the extrusion into the magazine in telescopic fashion, a plunger co-axial with the opening at the rear of the magazine, a piston for moving said plunger forwardly in said magazine, a cylinder in which said piston operates and means for introducing fluid under pressure into said cylinder to move said piston.

11. Apparatus for feeding plastic ceramic material to potteryware forming machinery comprising, in combination, a machine for pugging and extruding plastic ceramic material, said machine having an extrusion orifice, a conduit mounted in fixed position leading to said machinery, said conduit having a tubular magazine section provided with a side inlet at the front end thereof, a curved conduit connecting said orifice and inlet arranged to telescope the extrusion into said magazine from the front, a plunger co-axial with said magazine, means for moving said plunger forwardly therein to force material from the conduit and a valve in said curved conduit to be closed during the interval the plunger is moving forwardly in the magazine to close said curved conduit against back extrusion of material thereinto.

12. Apparatus for feeding plastic ceramic material to potteryware forming machinery comprising, in combination, a machine for pugging and extruding plastic ceramic material, said machine having an extrusion orifice, a conduit mounted in fixed position leading to said machinery, said conduit having a tubular magazine section provided with a side inlet at the front end thereof, a curved conduit connecting said orifice and inlet arranged to telescope the extrusion into said magazine from the front, a plunger co-axial with said magazine, means for moving said plunger forwardly therein to force material from the conduit and a valve in said curved conduit to be closed during the interval the plunger is moving forwardly in the magazine to close said curved conduit against back extrusion of material thereinto and a restriction in the conduit at the forward end of the magazine section to increase the resistance to movement of the material in the conduit between the restriction and the inlet during the interval when the magazine is being filled.

13. Apparatus for feeding plastic ceramic material to potteryware forming machinery comprising, in combination, a machine for pugging and extruding plastic ceramic material, said machine having an extrusion orifice, a conduit mounted in fixed position leading to said machinery, said conduit having a tubular magazine section provided with a side inlet at the front end thereof, a curved conduit connecting said orifice and inlet arranged to telescope the extrusion into said magazine from the front, a plunger co-axial with said magazine, means for moving said plunger forwardly therein to force material from the conduit the clay engaging surface of said plunger being shaped to form a groove in the trailing end of the extrusion in said magazine to support the extrusion issuing from the curved conduit as it is telescoped into the magazine and means for actuating said plunger and said pugging and extruding means.

14. Apparatus for feeding plastic ceramic material to potteryware fabricating machinery comprising, in combination, a machine for pugging and extruding plastic ceramic material, said machine having an extrusion orifice, a conduit leading to said fabricating machinery mounted in fixed position having a tubular magazine section provided with a side inlet for receiving extrusion from said machine, a plunger co-axial with the magazine section for movement therethrough to force material from said conduit, a conduit connecting said orifice and inlet positioned and formed to telescope the extrusion into said tubular magazine, and means for actuating said plunger and pugging and extruding machine said plunger having a normally open vent valve adjacent the material contacting surface to be closed by engagement of the material therewith.

15. Apparatus for feeding plastic ceramic material to potteryware fabricating machinery comprising, in combination, a machine for pugging and extruding plastic ceramic material said machine having an extrusion orifice, a conduit leading to said fabricating machinery mounted in fixed position having a tubular magazine section provided with a side inlet for receiving extrusion from said machine, a plunger co-axial with the magazine section for movement therethrough to force material from said conduit, a conduit connecting said orifice and inlet positioned and formed to telescope the extrusion into said tubular magazine, and means for actuating said plunger and pugging and extruding machine said plunger having a curved clay engaging surface sloping at an angle to the longitudinal centerline of the magazine for imparting a predetermined shape to the trailing end of the extrusion in said magazine.

16. The method of feeding plastic clay to molds in the manufacture of pottery ware which comprises, pugging and extruding a solid column of plastic ceramic material, bending the column around a radius incident to extrusion and telescoping it by movement along a line tangential to the arc of curvature into a tubular chamber and then detaching the column from the parent extrusion by moving it in endwise fashion at a uniform rate of travel by hydraulic pressure toward a point of charge segregation.

17. The method of feeding plastic ceramic material to molds in the manufacture of pottery ware which comprises, pugging and extruding a solid column of plastic ceramic material of given cross section, bending the column around a radius incident to extrusion and telescoping it into a tubular chamber by movement along a line tangential to the arc of curvature, filling the chamber and thereafter reversing the movement of the column therein to shear off the material from the parent mass and move the same in endwise fashion to a charge segregating position.

18. The method of feeding plastic ceramic material to a charge segregating position in the manufacture of pottery ware which comprises, pugging and extruding a solid column of clay, bending the column around a radius and telescoping the same into a tubular chamber whose center line is tangential to the arc of curvature of the column and after the chamber is filled, forcing the extrusion therefrom and simultaneously shearing off the material in the chamber from the parent mass and forming in the end of the parent mass and the end of the extrusion in the chamber, mating surfaces to be subsequently joined together incident to refilling of the chamber.

GEORGE J. CRONINGER.